(12) United States Patent
Okumura

(10) Patent No.: US 7,654,757 B2
(45) Date of Patent: Feb. 2, 2010

(54) DIAPHRAGM

(75) Inventor: Tetsuya Okumura, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 406 days.

(21) Appl. No.: 11/206,136

(22) Filed: Aug. 18, 2005

(65) Prior Publication Data

US 2006/0051085 A1 Mar. 9, 2006

(30) Foreign Application Priority Data

Sep. 3, 2004 (JP) ............................. 2004-257683

(51) Int. Cl.
*G03B 9/02* (2006.01)
(52) U.S. Cl. ...................................... 396/505; 396/507
(58) Field of Classification Search ................ 396/505, 396/506, 507, 508, 509, 510; 359/894
See application file for complete search history.

(56) References Cited

U.S. PATENT DOCUMENTS 5,635,999 A * 6/1997 O'Brien et al. ............. 396/508
6,767,146 B2 * 7/2004 Nishimoto .................. 396/463
7,085,032 B2 * 8/2006 Sato ........................... 359/230
2003/0095779 A1 * 5/2003 Chang ......................... 385/140
2004/0076423 A1 * 4/2004 Inoue et al. ................. 396/505
2005/0153214 A1 * 7/2005 Lin ................................ 430/5
2005/0226611 A1 * 10/2005 Kawaguchi ................. 396/505

FOREIGN PATENT DOCUMENTS

| JP | 56-014226 | 2/1981 |
|----|-----------|--------|
| JP | 09-096850 | 4/1997 |
| JP | 11-212138 | 8/1999 |
| JP | 11-305098 | 11/1999 |
| JP | 2002-202404 | 7/2002 |

* cited by examiner

*Primary Examiner*—Rodney E Fuller
(74) *Attorney, Agent, or Firm*—Young & Thompson

(57) ABSTRACT

A diaphragm comprising a single plate, the single plate comprising: a first plate portion having an aperture; and a second plate portion formed at an outer side of the first plate portion, wherein a first thickness of the first plate portion is thinner than a second thickness of the second plate portion.

21 Claims, 7 Drawing Sheets

DIAPHRAGM

This application is based on Japanese Patent application JP 2004-257683, filed Sep. 3, 2004, the entire content of which is hereby incorporated by reference. This claim for priority benefit is being filed concurrently with the filing of this application.

BACKGROUND OF THE INVENTION

1. Technical Field of the Invention

The present invention relates to a diaphragm inserted with an optical system, such as an imaging lens into a lens barrel and put to use.

2. Description of the Related Art

A diaphragm is incorporated in a lens unit of a camera and the like. A variable diaphragm unit a diameter of an aperture of which can be regulated in accordance with the brightness and the like is often used as a diaphragm incorporated in a lens unit. The lens units incorporated in, for example, a simplified photographic camera like a lens-carrying film unit, and the lens units of a simplified digital camera incorporated in a portable telephone also include a lens unit not mounted with a variable diaphragm. The light unnecessary for a photographing operation enters a lens unit in no small quantities to cause a flare and a ghost to occur, and the nobility of a photographic image to lower in some cases. For this reason, a fixed diaphragm having a constant diameter of a diaphragm aperture, and capable of preventing the incidence of harmful light and setting a F-value of a lens is used for the lens unit for the above-mentioned simplified camera.

A diaphragm formed by kneading carbon black and the like in a plastic sheet so as to give the light shielding property thereto, and providing the resultant plastic sheet with a diaphragm aperture has heretofore been utilized as such a fixed diaphragm. However, in order to maintain the strength and light shielding property of the plastic sheet, it is necessary that the sheet has a thickness of at least around 0.2 to 0.3 mm. However, a photographic lens used for, for example, a portable telephone has been miniaturized to the extent that a total length of the lens is reduced to around several millimeters. A further reduction of the thickness of the diaphragm as a whole has also been demanded with consideration given to a space in which the diaphragm is to be inserted. In the diaphragm made of one piece of the above-mentioned plastic sheet, the thickness thereof cannot be reduced satisfactorily since the diaphragm has the problems of the strength and light shielding property thereof. Even when a sheet of around 0.2 to 0.3 mm in thickness is used, a ghost/a flare occurring due to the reflected light from the edge portion of the diaphragm necessarily causes the deterioration of the property of the diaphragm.

The diaphragm known from JP-A-11-212138 (hereafter "JPA '138") is formed by laminating a thin sheet provided with a diaphragm aperture of a predetermined diameter therein on a thick sheet provided with an aperture of a diameter slightly larger than that of an object aperture. Since the diaphragm aperture is formed in the thin sheet, the unnecessary reflection of the light on an inner circumferential surface of the diaphragm is reduced, and the strength and light shielding property of the diaphragm is maintained owing to the thick sheet.

However, the diaphragm disclosed in JPA '138 needs to prepare two pieces of sheets formed by the press working respectively, and an operation for pasting the sheets on each other accurately with a bonding agent so that the centers of the diaphragm aperture are aligned with each other becomes necessary, so that the manufacturing cost increases. Since the thin sheet provided with the diaphragm aperture is as thin as 0.04 to 0.09 mm, the surrounding portion of the aperture, which is not laminated on the thick sheet, of the thin sheet has light transmission of around 5%, i.e., the light shielding property was unsatisfactory.

SUMMARY OF THE INVENTION

The present invention has been made in view of the above-mentioned circumstances, and an object thereof is to provide a diaphragm maintaining satisfactory strength and not permeating the light even when the thickness of the diaphragm is reduced, and capable of reducing the occurrence of a flare and a ghost.

In order to achieve this object, the diaphragm according to an embodiment of the present invention is made of one sheet of thin metal plate, wherein the thickness of the area of the plate in which the diaphragm aperture is formed is smaller than that of the area thereof which surrounds an outer side of the aperture.

The same diaphragm as is defined above, wherein an inner edge of the aperture-carrying thin plate is preferably chamfered.

The same diaphragm as is defined above, wherein an inner circumferential surface of the aperture-carrying thin plate is preferably subjected to a light reflection suppressing surface treatment.

The diaphragm according to an embodiment of the present invention is made of one sheet of thin metal plate, and the thickness of the area thereof in which the diaphragm aperture is formed is smaller than that of the area which surrounds an outer side of the aperture-carrying area. Since the diaphragm is made of one sheet of thin metal plate, the transmission of the light therethrough can be prevented. Moreover, since the thickness of the area of the diaphragm in which the aperture is formed is smaller than that of the area thereof which surrounds the outer side of the aperture-carrying area, the reflection of the light on the inner circumferential surface of the aperture can be further held down as the strength of the diaphragm is maintained. This enables a diaphragm maintaining a satisfactory strength thereof, not permeating the light therethrough, and reducing the occurrence of a flare and a ghost therein to be provided.

Since the edge of the diaphragm aperture of the aperture-carrying thin plate is chamfered, the diaphragm aperture is diverged toward the edge on the incidental side thereof and toward the outgoing side thereof. Therefore, even when the diaphragm aperture is narrowed with the miniaturization of the diaphragm based on the miniaturization of the optical system, the occurrence of an eclipse and the like can be held down.

Since the inner circumferential surface of the thin plate in which the aperture is formed is subjected to a surface treatment for suppressing the light reflection thereon, the reflection of the light on the inner circumferential surface of aperture can be held down. This makes it possible to provide a diaphragm in which the occurrence of a ghost and a flare are further reduced.

BRIEF DESCRIPTION OF THE DRAWINGS

FIG. 2 is a cross-sectional view taken longitudinally along the optical axes of the photographing lens, diaphragm, CCD image sensor and the like.

Figure 1A:
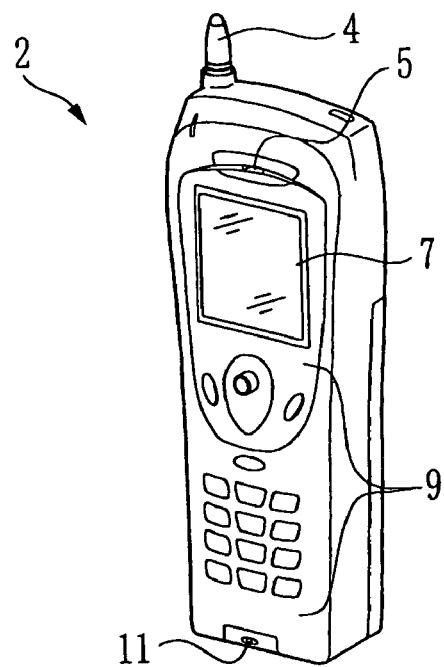
FIGS. 1A to 1B are perspective views of a camera-carrying portable telephone in which the diaphragm according to one embodiment of the present invention is incorporated.

Reference numerals are used to identify various elements in the drawings including the following:

2 Camera-carrying portable telephone
24 First lens
25 Second lens
26 Third lens
28 Diaphragm
28a First plate type portion
28b Second plate type portion
28c Front surface
28d Rear surface
35 Diaphragm aperture
35a Inlet
35b Outlet
35c Inner circumferential surface
35d Inlet peripheral portion
35e Outlet peripheral portion

DETAILED DESCRIPTION OF THE INVENTION

Figure 1B:
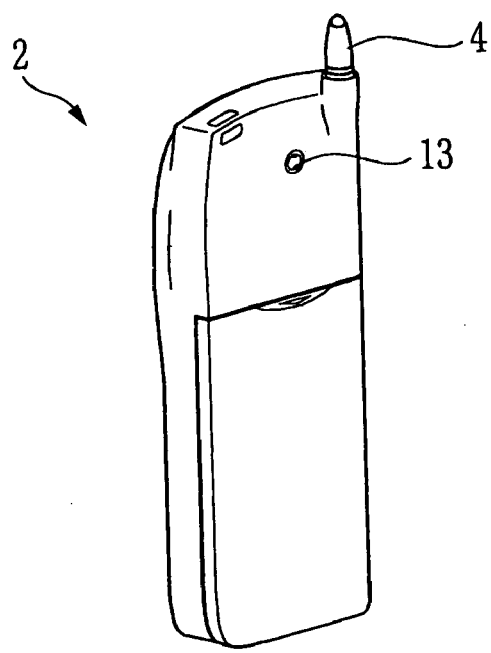

FIG. 1 shows a camera-carrying portable telephone containing the diaphragm according to one embodiment of the present invention therein. As shown in FIG. 1A, the camera-carrying portable telephone 2 is provided at an upper portion thereof with a communication antenna 4, and at an upper portion of a front surface thereof with a receiving speaker 5 for outputting the voice of the opposite speaking party, an image displaying liquid crystal frame 7, an operating buttons 9 for carrying out various operations including the inputting of a telephone number and the like, a transmission microphone 11 for transmitting the voice of a user to the opposite speaking party, and the like. FIG. 1B is a perspective view showing a rear surface of the camera-carrying portable telephone. A first lens 24 provided in a lens unit, which will be described later, is exposed to the outside of the rear surface of the camera-carrying portable telephone 2. The camera-carrying portable telephone 2 can switch to each other a speaking mode for making a telephone call to someone and a photographing mode in which the photographing of an object can be done. When the camera-carrying portable telephone 2 is set to a photographing mode with a predetermined photographing operation carried out by a user, picture plane data on an object are formed by a first lens 13 and the like.

Figure 2:
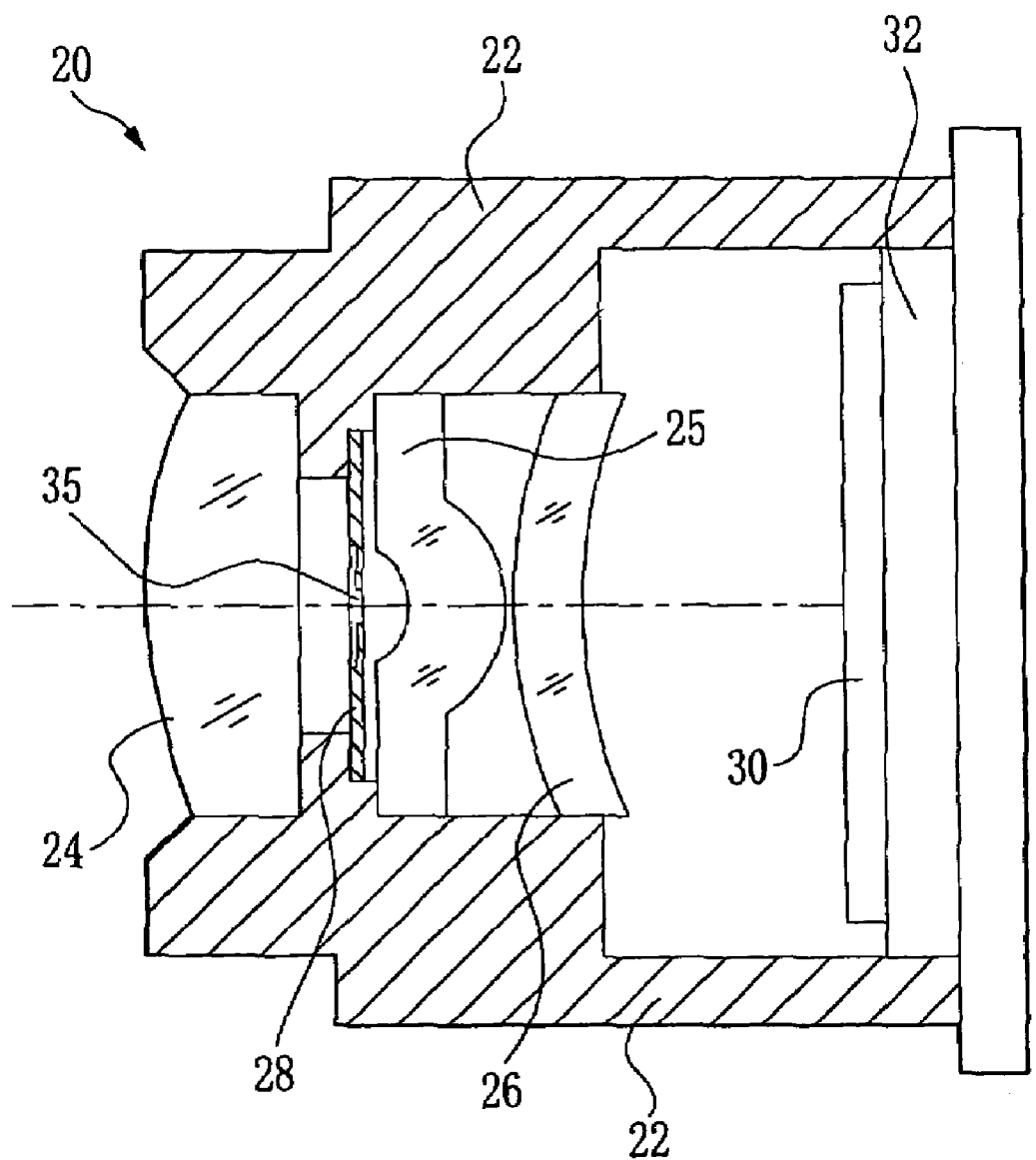

FIG. 2 shows a lens unit shown in section by cutting a lens unit, which is made of a lens barrel and the like holding the first lens therein, longitudinally along the optical axis. A lens unit 20 includes a lens barrel 22, first, second and third lenses 24, 25, 26, a diaphragm 28, a CCD image sensor 30, etc. The first to third lenses 24 to 26 and diaphragm 28 are held in the lens barrel 22, and the outer diameter of the first, second and lenses 24, 25, 26 are around 7 to 8 mm, the first to third lenses 24 to 26 being arranged so that the optical axes thereof are aligned with one another. The diaphragm 28 is provided as an aperture diaphragm between the first lens 24 and second lens 25, and a bundle of rays inputted from the first lens 24 into the second lens 25 is restricted by this diaphragm 28. The diaphragm 28 is provided with a diaphragm aperture 35 for passing the light therethrough, and the diaphragm aperture 35 is provided in the interior of the lens barrel 22 so that the optical axes of the first to third lenses 24 to 26 pass a predetermined position in the diaphragm aperture 35. The CCD image sensor 30 is provided on the side of an image surface of the third lens 26, and fixed on a circuit substrate of the same.

Figure 3:
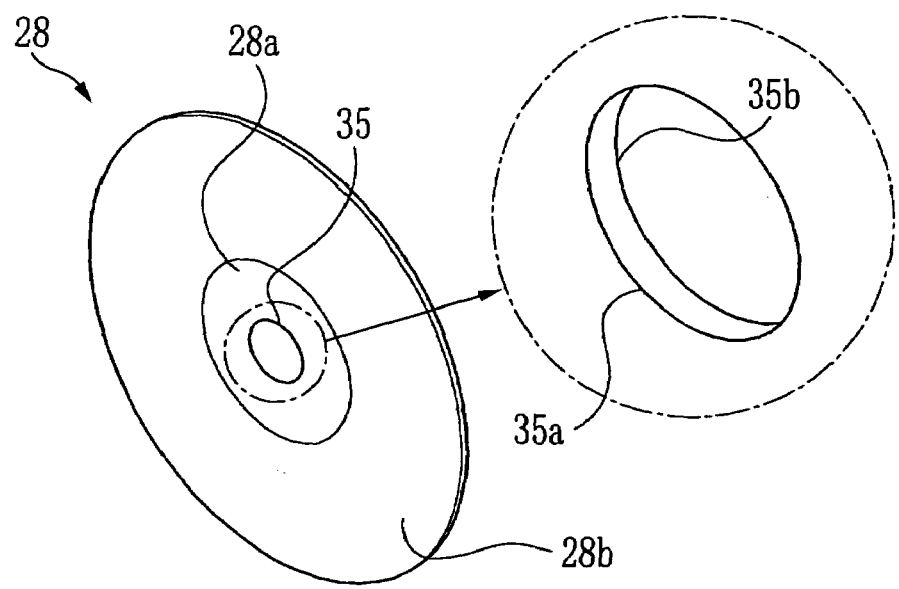
FIG. 3 is a perspective view of the diaphragm having a circular diaphragm aperture and observed from the diagonally front side thereof.

FIG. 3 shows the diaphragm 28 in perspective. The diaphragm 28 is formed in the shape of a disc, and includes a first plate portion 28a provided with a diaphragm aperture 35, and a second plate portion 28b formed so as to be continued to a circumference of the first plate portion 28a. The diaphragm aperture 35 is formed so as to extend from a front surface 28c (refer to FIG. 4) of the first plate portion 28a to a rear surface 28d (refer to FIG. 4), and a diameter of the diaphragm aperture 35 is set so as to gradually increase toward an inlet and an outlet of the diaphragm aperture 35. The first plate portion 28 is provided at the side of a front surface 28c thereof with an inlet 35a of the diaphragm aperture 35, and at the side of a rear surface 28d thereof with an outlet 35b of the diaphragm aperture 35.

Figure 4:
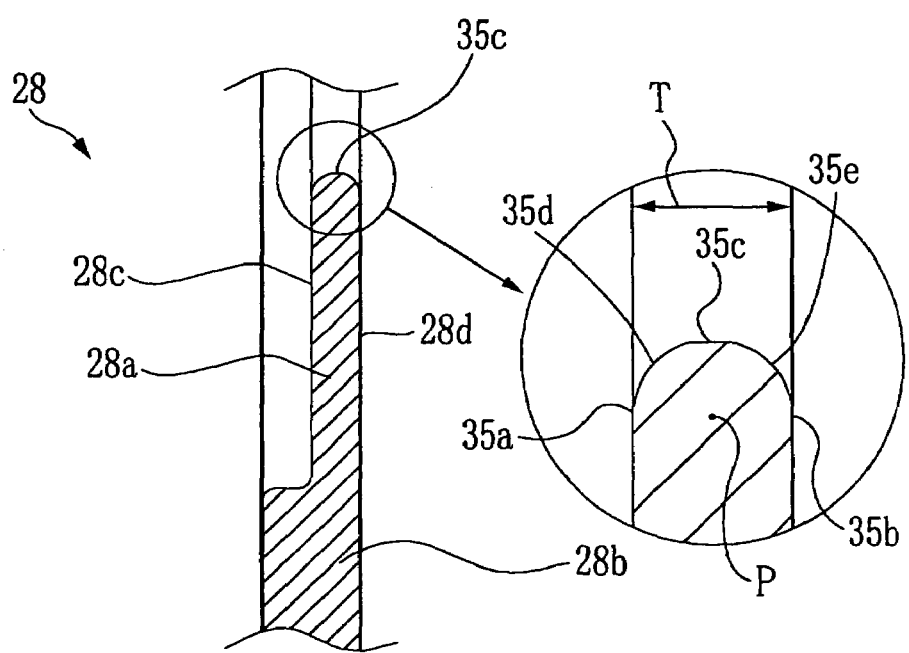
FIG. 4 is a cross-sectional view of the surroundings of the diaphragm aperture taken longitudinally in the direction of the thickness thereof.
Figure 5:
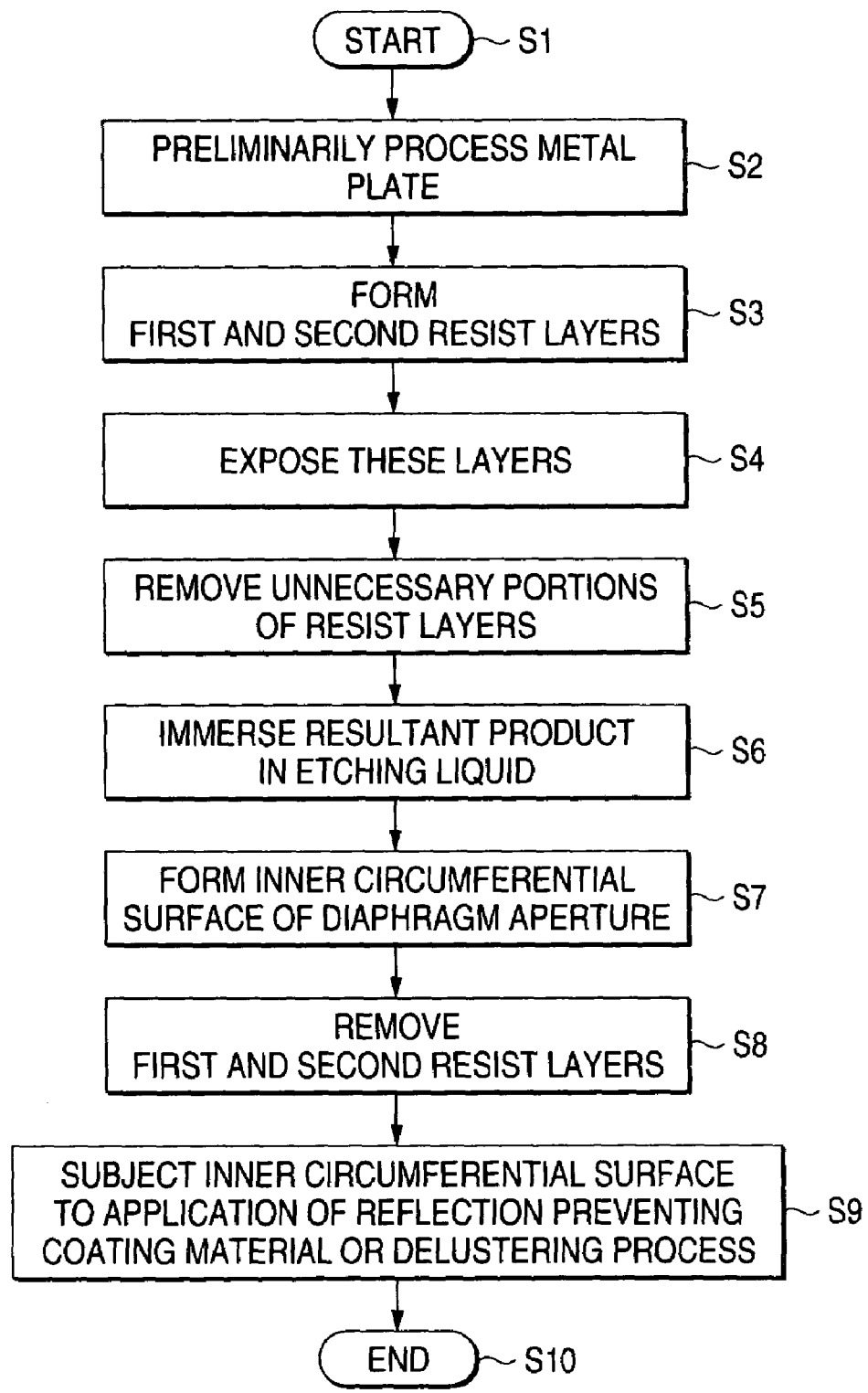
FIG. 5 is a flow chart roughly describing the method of manufacturing the diaphragm.

FIG. 4 is a sectional view showing the surroundings of the diaphragm aperture 35, in which the surroundings of the aperture are cut longitudinally in the direction of the thickness thereof. The thickness of the first plate portion 28a is set smaller than that of the second plate portion 28b. The thickness of the first plate portion 28a is preferably 0.01 to 0.02 mm, and the thickness of the second plate portion 28b preferably to 0.05 to 0.10 mm. The distance between a boundary portion between the second plate portion 28b and first plate portion 28 and the diaphragm aperture 35 is preferably 0.2 to 0.5 mm. When the thickness of the second plate portion 28b is thus set larger than that of the first plate portion 28a in which the aperture 35 is formed, the strength of the diaphragm 28 is maintained satisfactorily.

The edge of the aperture on the incidental side of the first plate portion 28a in which the diaphragm aperture 35 is formed, and the edge of the aperture on the outgoing side are chamfered respectively. An inner circumferential surface 35c is formed so as to extend from an inlet 35a of the diaphragm aperture 35 to an outlet 35b thereof. Out of the inner circumferential surface 35c of the diaphragm aperture, an inlet peripheral portion 35d and an outlet peripheral portion 35e are made round. The inlet peripheral portion 35d and outlet peripheral portion 35e are made of curved surfaces, which are formed with a point P, which is positioned in the interior of the first plate portion 28a, as a center of curvature. This structure causes a cross section S (refer to FIG. 7) of the diaphragm aperture 35 substantially parallel to the surface 28c of the first plate portion 28a to increase gradually toward the inlet 35a and outlet 35b. The inner circumferential surface 35c of the diaphragm 35 is coated with a light absorbing coating material, by which the reflection of light on the inner circumferential surface 35c is held down. In this embodiment, the center of curvature of the curved surfaces constituting the inlet peripheral portion 35d and outlet peripheral portion 35e is positioned in the interior of the first plate portion 28a but a curved surface the center of curvature of which is positioned in the interior of the second plate portion may constitute the inlet peripheral portion and outlet peripheral portion.

Figure 6A:
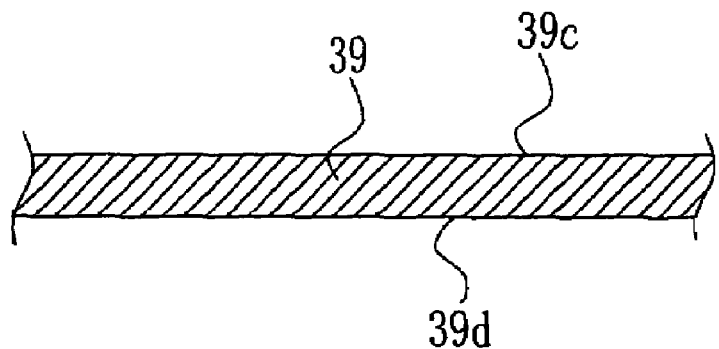
FIG. 6A is a cross-sectional view of a metal plate obtained by the press working.

A method of manufacturing the diaphragm will be described by using FIG. 5 and FIGS. 6A to 6C. As shown in FIG. 6A, a metal plate 39 of which the diaphragm 28 is made is prepared in advance. This metal plate 39 is subjected to a preliminary treatment, such as the removal of fine recesses and projections existing in and on the surface thereof and the washing of the metal plate. For example, phosphor bronze and stainless steel are used as a raw material for the metal plate.

Figure 6B:
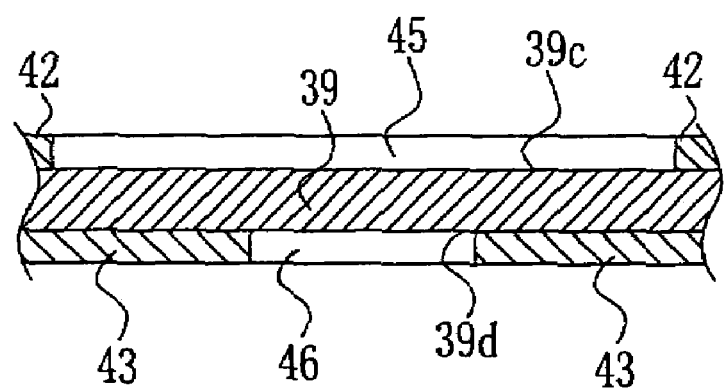
FIG. 6B is a cross-sectional view of the metal plate on which the first and second resist layers are formed.

After the metal plate is preliminarily processed, a first resist layer 42 is laminated on a surface 39c of the metal plate 39, and a second resist layer 43 on a rear surface 39d of the metal plate 39. Ultraviolet rays are applied to the first and second resist layers 42, 43. After the ultraviolet rays are applied to the metal plate, the portions of the metal plate to which the ultraviolet rays are not applied are removed therefrom by a liquid developer. As a result, a first aperture 45 and a second aperture 46 are formed in the first and second resist layers 42, 43 as shown in FIG. 6B. The second aperture 46 is made small as compared with the first aperture 45. In this embodiment, the first aperture 45 and second aperture 46 are formed by utilizing a positive method permitting the portions of the first and second resist layers 42, 43 which are not irradiated with the ultraviolet rays to be left on the metal plate. The first aperture 45 and second aperture 46 may also be formed in the first and second resist layers 42, 43 by utilizing a negative method which permits the portions irradiated with ultraviolet rays to be left on the metal plate 39.

Figure 6C:
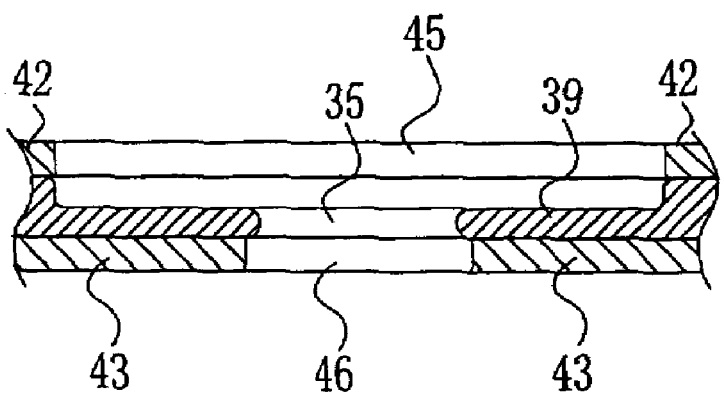
FIG. 6C is a cross-sectional view of the metal plate in which an etching solution is made to flow to form a diaphragm aperture.

After the first aperture 45 and second aperture 46 are formed, the metal plate 39 is immersed in an etching liquid for a predetermined period of time, and the etching liquid corrodes the metal plate 39 from the first aperture 35 and second aperture 46. As shown in FIG. 6C, the shapes of the inner circumferential surfaces of the diaphragm apertures are completed. After the shapes of the inner circumferential surfaces of the diaphragm apertures are formed, the first and second resist layers 42, 43 are removed, and the outer shape of the diaphragm 28 is completed.

After the first and second resist layers 42, 43 are removed from the metal plate 39 in which the diaphragm aperture is formed, the surface of the metal plate 39 including the inner circumferential surface and the like of the diaphragm aperture is subjected to a light absorption surface treatment to complete the diaphragm 28. The surface treatment methods include, for example, a method of applying light absorbing coating material to the surface of the metal plate, and a method of subjecting the surface of the metal plate to a delustering treatment, by which the reflection of the light can be held down. When the diaphragm 28 is thus manufactured by using an etching process, the provision of a highly accurate diaphragm member can be expected. The phosphor bronze and stainless steel are preferably used as raw materials for the metal plate. The raw metal materials are not limited to these, and, when there is other suitable material, it may be used suitably.

Figure 7:
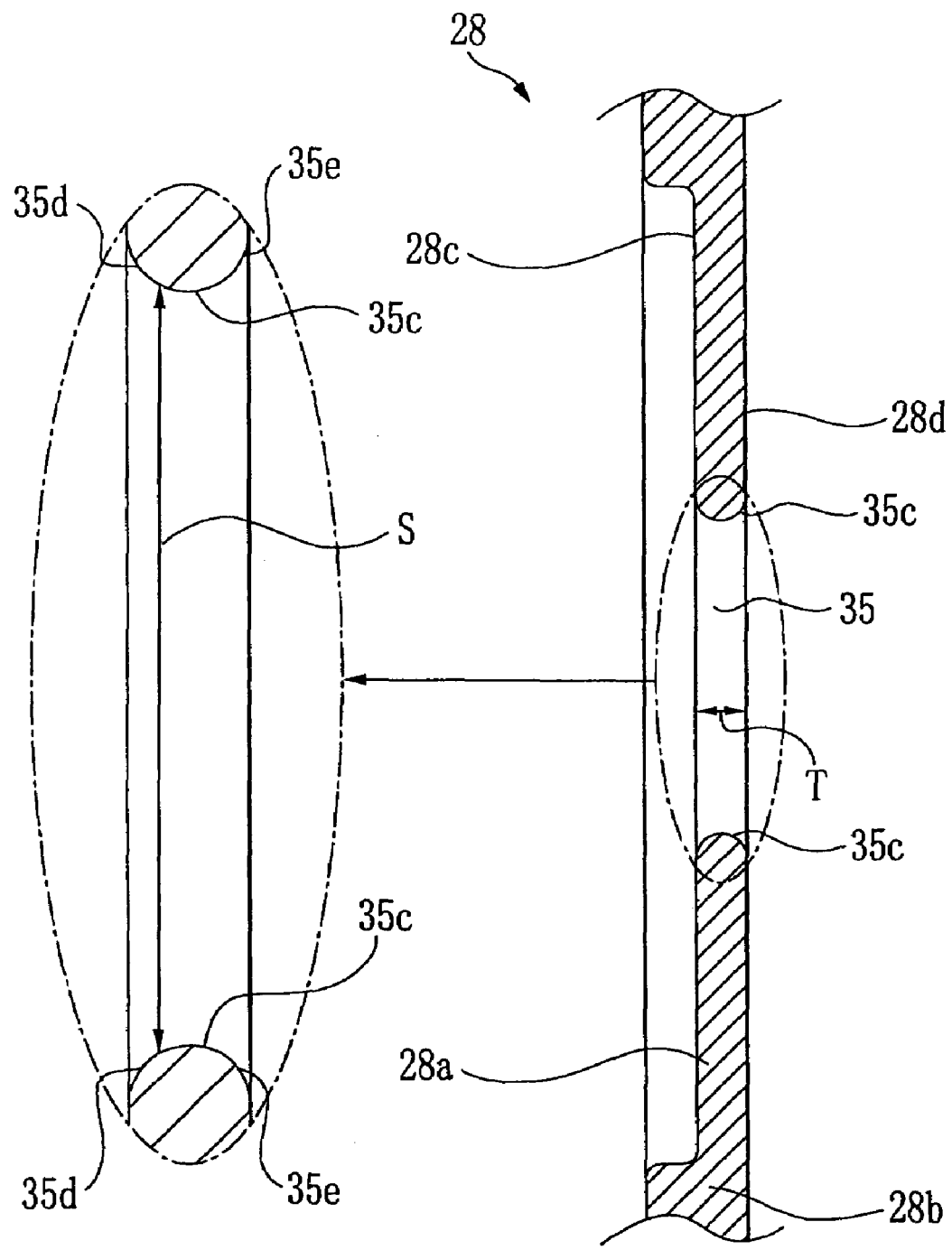
FIG. 7 is an explanatory drawing describing the operation of the diaphragm conceptually by utilizing a cross-sectional drawing of the diaphragm cut in the direction of the thickness thereof.

The operation of the present invention will now be described. FIG. 7 is an explanatory drawing describing the operation of the diaphragm 28 conceptually by using a sectional view of the diaphragm 28 cut in the direction of the thickness thereof. The diaphragm 28 is provided between the first lens 24 and second lens 25, and a periphery of the diaphragm 28 is held in the lens barrel. The axes of the first to third lenses 24 to 26 pass through a predetermined position in the diaphragm aperture 35 formed in the diaphragm 28. Since the second plate portion 28b of the diaphragm 28 is formed thicker than the first plate portion 28a, the strength of the diaphragm 28 is maintained so that the diaphragm 28 is not easily deformed. Since the diaphragm aperture 35 is formed in the first thin plate type portion 28a, the reflection of light on the inner circumferential surface 35c of the diaphragm 35 can be held down, so that the quality of an image is improved.

The inlet peripheral portion 35d and outlet peripheral portion 35e of the inner circumferential surface 35c of the diaphragm aperture 35 are formed round. Therefore, the size of the cross section S of the diaphragm aperture 35 parallel to the surface 28c of the first plate portion 28a increases toward the inlet 35a and outlet 35b. Therefore, even in a portable telephone in which the dimensions of a lens unit are small, the occurrence of eclipse can be held down. The inner portion of the diaphragm aperture 35 is subjected to a coating treatment using light absorbing coating material or a treatment using a black delustering material. This enables the reflection of the light, which enters the first lens 24, on the inner circumferential surface 35c of the diaphragm aperture 28a to be held down, and the occurrence of a ghost and a flare to be further reduced.

In the above-described embodiment, an example in which a lens barrel 22 with a diaphragm 28 incorporated therein is provided in a camera-carrying portable telephone 2 is shown but an apparatus provided with a lens barrel in which a diaphragm is incorporated is not limited to this. For example, the diaphragm may be incorporated in a lens barrel provided in a photographing apparatus, such as a digital camera for forming image data on the basis of an image signal from an imaging element. When a lens barrel in which the diaphragm according to the present invention is incorporated is provided in a photographing apparatus, the provision of a photographing apparatus of a more compact structure and capable of obtaining an image of a higher quality can be expected.

Figure 8:
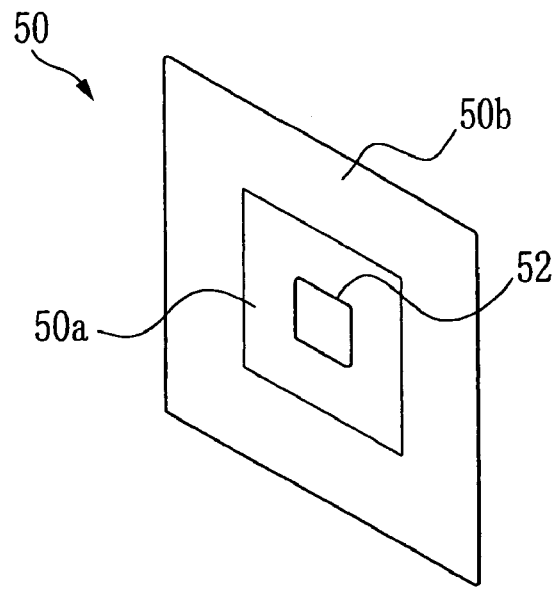
FIG. 8 is a perspective view showing a diaphragm in which a square diaphragm aperture is formed.

In the above-described embodiment, the shape of the diaphragm aperture was circular shape but the shape of the diaphragm aperture is not limited to this. The shape may be elliptic shape and rectangular shape. FIG. 8 shows the diaphragm 50 in perspective having a diaphragm aperture 52 formed squarely. The second plate portion 50b is formed so as to enclose therewith the circumference of the first plate portion 50a in which the diaphragm aperture 52 is formed. Since the thickness of the first plate portion 50a is set smaller than that of the second plate portion 50b, the occurrence of a flare and a ghost can be held down in accordance with the shape of the square CCD image sensor positioned on the side of an image of the photographing lens. Since the shape of the, diaphragm aperture is thus made square, the suppression of the occurrence of a flare and a ghost in accordance with the image obtained can be expected, and the obtainment of an image of a higher quality becomes possible.

Figure 9:
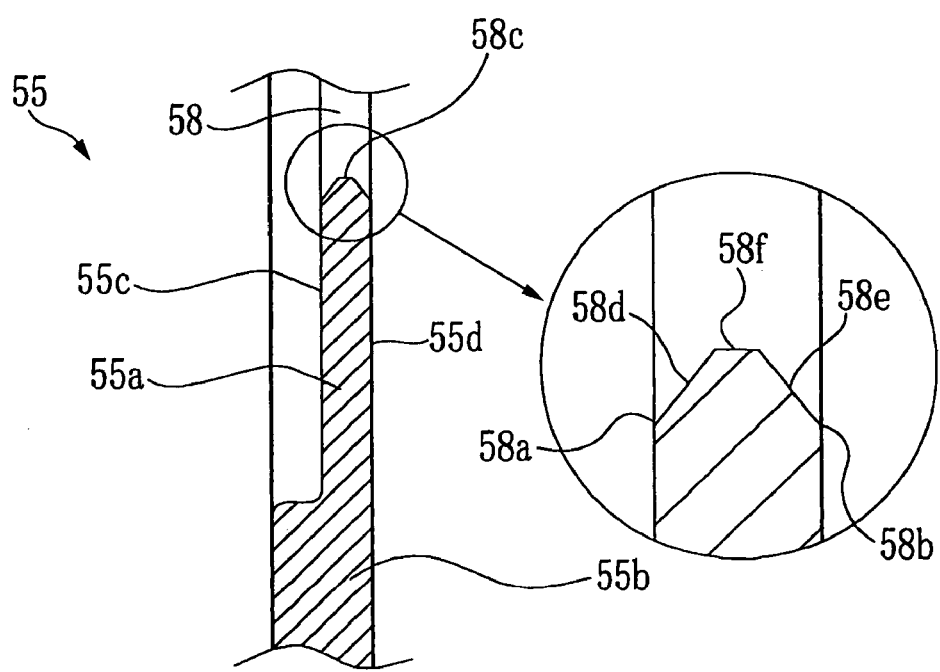
FIG. 9 is a cross-sectional view taken longitudinally in the direction of the thickness of a diaphragm in which the inner circumferential surface of the diaphragm aperture is made of first, second and third inclined portions.

In the above-described mode of embodiment, the inlet peripheral portion 35d and outlet peripheral portion 36e out of the inner circumferential surface 35c of the diaphragm aperture 35 are formed round but the shape of the inner circumferential surface of the diaphragm aperture is not limited to this. For example, as shown in FIG. 9, the inner circumferential surface 58c of the diaphragm 55 may be made of a first inclined portion 58d, a second inclined portion 58f and a third inclined portion 58e. The first inclined portion 58d and third inclined portion 58e extend diagonally so that the diameter of the aperture increases toward the inlet 58a and outlet 58b. This enables an eclipse, which occurs when the diaphragm aperture is made small, to be prevented. The inner circumferential surface made of the first to third inclined portions may be formed in this manner.

In the above-described embodiment, the diaphragm 28 was utilized as an aperture-carrying diaphragm for the purpose of restricting the quantity of light entering the CCD image sensor 30. According to the present invention, the purpose of using the diaphragm is not limited to such but the diaphragm may be utilized as a light shielding diaphragm for the purpose of only eliminating harmful light which causes a flare and a ghost to occur. Since the harmful light out of the light inputted from the photographing lens into the CCD image sensor 30 is cut off by the light shielding diaphragm, the entry of the harmful light into the CCD image sensor 30 can be prevented, and the obtainment of a high-quality image becomes possible.

What is claimed is:

1. A diaphragm comprising a single plate, the single plate comprising:
    a first plate portion having an aperture; and
    a second plate portion formed at an outer side of the first plate portion, wherein a first thickness of the first plate portion is thinner than a second thickness of the second plate portion, and a diameter of the aperture gradually increases toward an inlet and an outlet of the aperture,
    wherein an inlet peripheral portion of the aperture and an outlet peripheral portion of the aperture are made of curved surfaces that are formed with respect to a point which is positioned in an interior of the first plate portion as a center of curvature.

2. The diaphragm according to claim 1, wherein the single plate is a metal plate.

3. The diaphragm according to claim 2, wherein the metal plate contains one of a phosphor bronze or a stainless steel.

4. The diaphragm according to claim 2, wherein the first plate portion is formed by an etching process.

5. The diaphragm according to claim 1, wherein the first thickness is from 0.01 to 0.02 mm.

6. The diaphragm according to claim 1, wherein the second thickness is from 0.05 to 0.1 mm.

7. The diaphragm according to claim 1, wherein the aperture has a circular shape.

8. The diaphragm according to claim 1, wherein a distance from a boundary portion between the first plate portion and the second plate portion to the aperture is 0.2 to 0.5 mm.

9. The diaphragm according to claim 1, wherein the aperture has an elliptic shape.

10. The diaphragm according to claim 1, wherein the aperture has a rectangular shape.

11. The diaphragm according to claim 1, wherein an inner edge of the aperture is chamfered.

12. The diaphragm according to claim 11, wherein the chamfered edge is a round shape.

13. The diaphragm according to claim 11, wherein the chamfered edge is a linear shape.

14. The diaphragm according to claim 1, wherein an inner circumferential surface of the first plate portion is subjected to a light absorption surface treatment.

15. The diaphragm according to claim 14, wherein the light absorption surface treatment is carried out by a method of applying light absorbing coating material to the inner circumferential surface.

16. The diaphragm according to claim 14, wherein the light absorption surface treatment is carried out by a method of subjecting the inner circumferential surface to a delustering treatment.

17. A single metal diaphragm plate, comprising:
    a first plate portion having an aperture; and
    a second plate portion formed at an outer side of the first plate portion, wherein a thickness of the first plate portion is from 0.01 to 0.02 mm, and a thickness of the second plate portion is from 0.05 to 0.1 mm, and a diameter of the aperture gradually increases toward an inlet and an outlet of the aperture,
    wherein an inlet peripheral portion of the aperture and an outlet peripheral portion of the aperture are made of curved surfaces that are formed with respect to a point which is positioned in an interior of the first plate portion as a center of curvature.

18. The single metal diaphragm plate according to claim 17, wherein the single plate contains one of a phosphor bronze or a stainless steel.

19. The single metal diaphragm plate according to claim 17, wherein the aperture has a circular shape.

20. The single metal diaphragm plate according to claim 17, wherein the aperture has an elliptic shape.

21. The single metal diaphragm plate according to claim 17, wherein the aperture has a rectangular shape.

* * * * *